United States Patent
Cheng

(10) Patent No.: US 7,567,400 B2
(45) Date of Patent: Jul. 28, 2009

(54) METHOD AND APPARATUS FOR IMPROVING THE ERROR RATE OF TRACK INFORMATION ON A MAGNETIC STORAGE DEVICE

(75) Inventor: Nelson Cheng, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 47 days.

(21) Appl. No.: 11/117,258

(22) Filed: Apr. 27, 2005

(65) Prior Publication Data

US 2006/0245102 A1 Nov. 2, 2006

(51) Int. Cl.
G11B 15/04 (2006.01)
(52) U.S. Cl. .......................... 360/60; 360/31; 360/77.02
(58) Field of Classification Search ...................... None
See application file for complete search history.

(56) References Cited

U.S. PATENT DOCUMENTS

| | | | |
|---|---|---|---|
| 4,516,165 A | 5/1985 | Cunningham et al. | |
| 4,620,243 A * | 10/1986 | Bakken et al. | 360/77.05 |
| 5,265,104 A * | 11/1993 | Weng | 714/766 |
| 5,353,170 A | 10/1994 | Fung et al. | |
| 5,392,290 A | 2/1995 | Brown et al. | |
| 5,909,334 A * | 6/1999 | Barr et al. | 360/53 |
| 5,923,485 A | 7/1999 | Ito | |
| 6,084,729 A | 7/2000 | Ito | |
| 6,310,741 B1 | 10/2001 | Nishida et al. | |
| 6,408,416 B1 * | 6/2002 | Morley et al. | 714/763 |
| 6,429,984 B1 * | 8/2002 | Alex | 360/31 |
| 6,442,705 B1 * | 8/2002 | Lamberts | 714/2 |
| 6,442,715 B1 * | 8/2002 | Wilson | 714/710 |
| 6,462,896 B1 * | 10/2002 | Codilian et al. | 360/48 |
| 6,466,387 B1 * | 10/2002 | Ogasawara et al. | 360/48 |
| 6,603,617 B1 * | 8/2003 | Cross | 360/31 |
| 6,657,805 B2 * | 12/2003 | Nishida et al. | 360/60 |
| 6,700,723 B2 | 3/2004 | Li | |
| 6,947,234 B2 * | 9/2005 | Lamberts et al. | 360/53 |
| 7,076,604 B1 * | 7/2006 | Thelin | 711/112 |
| 7,177,979 B2 * | 2/2007 | Kuwamura | 711/112 |
| 7,345,837 B1 * | 3/2008 | Schreck et al. | 360/31 |
| 2001/0010603 A1 | 8/2001 | Uzumaki et al. | |
| 2002/0003675 A1 * | 1/2002 | Tomiyama et al. | 360/53 |

(Continued)

FOREIGN PATENT DOCUMENTS

EP 1564736 A2 * 8/2005

(Continued)

OTHER PUBLICATIONS

"Preventative Rewrites" IBM TDB, May 1991, pp. 331ff.

(Continued)

*Primary Examiner*—Hoa T Nguyen
*Assistant Examiner*—Dismery E Mercedes

(57) ABSTRACT

An apparatus and method for improving the error rate of track information on a magnetic storage device is disclosed. One embodiment provides a counter for counting the number of writes to a first track on a magnetic storage device. In addition, a re-read and re-write initiator is provided for reading information from a second track adjacent to the first track and re-writing the information read from the second track back to said magnetic storage device when said counter reaches a pre-defined number of writes for the fist track.

21 Claims, 7 Drawing Sheets

U.S. PATENT DOCUMENTS

| | | |
|---|---|---|
| 2002/0138692 A1* | 9/2002 | Gerhart ................ 711/112 |
| 2003/0067697 A1 | 4/2003 | Weinstein et al. |
| 2003/0133214 A1* | 7/2003 | Miller et al. ............. 360/48 |
| 2003/0214743 A1 | 11/2003 | Urata |
| 2004/0190188 A1* | 9/2004 | Zaitsu ................ 360/77.02 |
| 2005/0168859 A1* | 8/2005 | Cho et al. ................. 360/55 |
| 2005/0180267 A1* | 8/2005 | Jeong et al. ............. 368/96 |
| 2006/0066971 A1* | 3/2006 | Alex et al. ................. 360/31 |

FOREIGN PATENT DOCUMENTS

| | | |
|---|---|---|
| JP | 63282907 | 11/1988 |
| JP | 6052635 | 2/1994 |

OTHER PUBLICATIONS

"Prevention of Hard Errors in Magnetic Files Due to Long Term Degradation" IBM TDB, Mar. 1987, pp. 4577ff.

\* cited by examiner

METHOD AND APPARATUS FOR IMPROVING THE ERROR RATE OF TRACK INFORMATION ON A MAGNETIC STORAGE DEVICE

TECHNICAL FIELD

The present invention relates to the field of information storage, and more particularly to an apparatus and method for improving the error rate of track information on a magnetic storage device.

BACKGROUND ART

Magnetic drives such as hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size and the disk has seen significant increase in its recording density. Much of the refinement has been driven by consumer demand for smaller and more portable hard drives such as those used in personal digital assistants (PDAs), MP3 players, and the like. For example, the original hard disk drive had a disk diameter of 24 inches with a recording density <1 Megabits/in$^2$ (Mb/in2). Modern hard disk drives are much smaller and include disk diameters of less than 2.5 inches (micro drives are significantly smaller than that) with recording densities >100 Gigabits/in2. Advances in magnetic recording are also primary reasons for the reduction in size.

The increase of recording density has been achieved through the dramatic increase in both of the recording linear density, kilobits per inch (KBPI), and the track density kilo-tracks per inch (KTPI). In general, an increase of linear density type means recorded bits have to be packed in dense configuration along the circumferential direction on a track written on the disk. Error rate can be significantly degraded by the increase of linear density.

An increase of the track density type implies that the recorded tracks along the radial direction of a disk are packed closer together. When the written tracks are packed closer together, not only does the error rate performance of a written track degrade but also the adjacent track interference (ATI) will become a severe problem. In general, ATI occurs when old information stored in the adjacent tracks (typically the two neighboring tracks on either side) of the data track being written become degraded after many repetitive writings to the data track. For example, as shown in Prior Art FIG. 1, a read-write head 105 has a fringe field 110 (or writing bubble) associated with the write process. In general, when the head 105 is writing to track n on disk 120, a portion of the fringe field 110 overlaps onto tracks n+1 and n−1. This overlap will result in added noise and degradation of the data on the tracks n+1 and n−1.

With reference now to Prior Art FIG. 2, the fringe field effect can also be more problematic at the inner diameter (ID) 210 and outer diameter (OD) 220 of the disk 120 where the read and write head mounted on the actuator 230 is not symmetric with respect to the disk track but is skewed (e.g., at an angle) with respect to the track. In general, the skew provides additional and variable loss rates per adjacent tracks of the disk 120 depending on the location of the actuator 230, e.g., ID 210, middle 215, or OD 220.

Presently, there are two main methods to overcome the ATI issue. The first method is to reduce the size of the head 105, thereby reducing the size of the fringe field 110. However, as is well known in the art, the reduction of the size of head 105 results in an increased error loss rate in the recording system. The second method is to stop decreasing the track pitch (or width). However, maintaining the track at a fixed pitch significantly impacts the capability to increase storage capacity on the magnetic storage device.

SUMMARY

An apparatus and method for improving the error rate of track information on a magnetic storage device is disclosed. One embodiment provides a counter for counting the number of writes to a first track on a magnetic storage device. In addition, a re-read and re-write initiator is provided for reading information from a second track adjacent to the first track and re-writing the information read from the second track back to said magnetic storage device when said counter reaches a pre-defined number of writes for the fist track.

BRIEF DESCRIPTION OF THE DRAWINGS

Prior Art

Prior Art

BEST MODES FOR CARRYING OUT THE INVENTION

Figure 1:
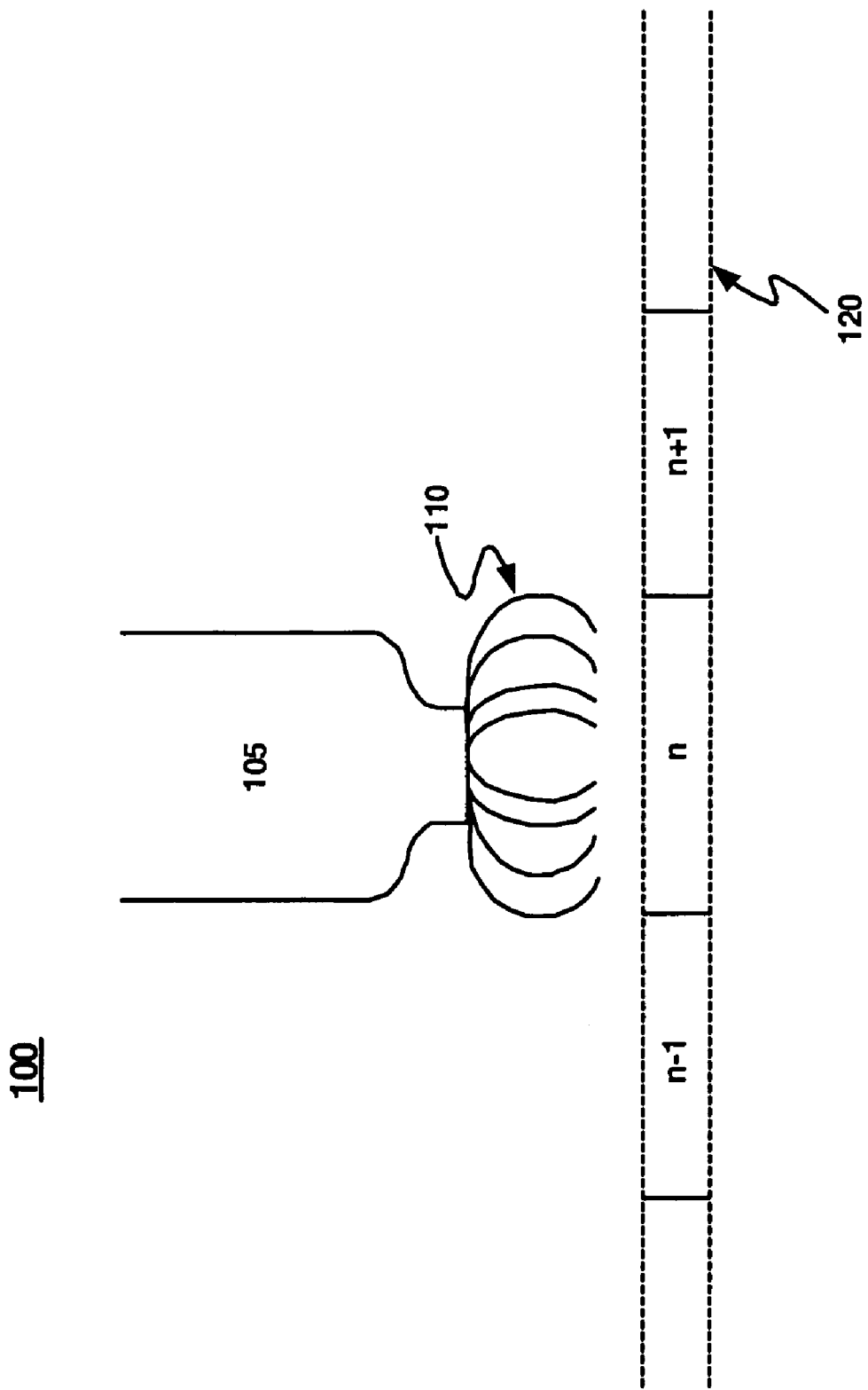
FIG. 1 is an exemplary side view of a read-write head for a storage device.
Figure 2:
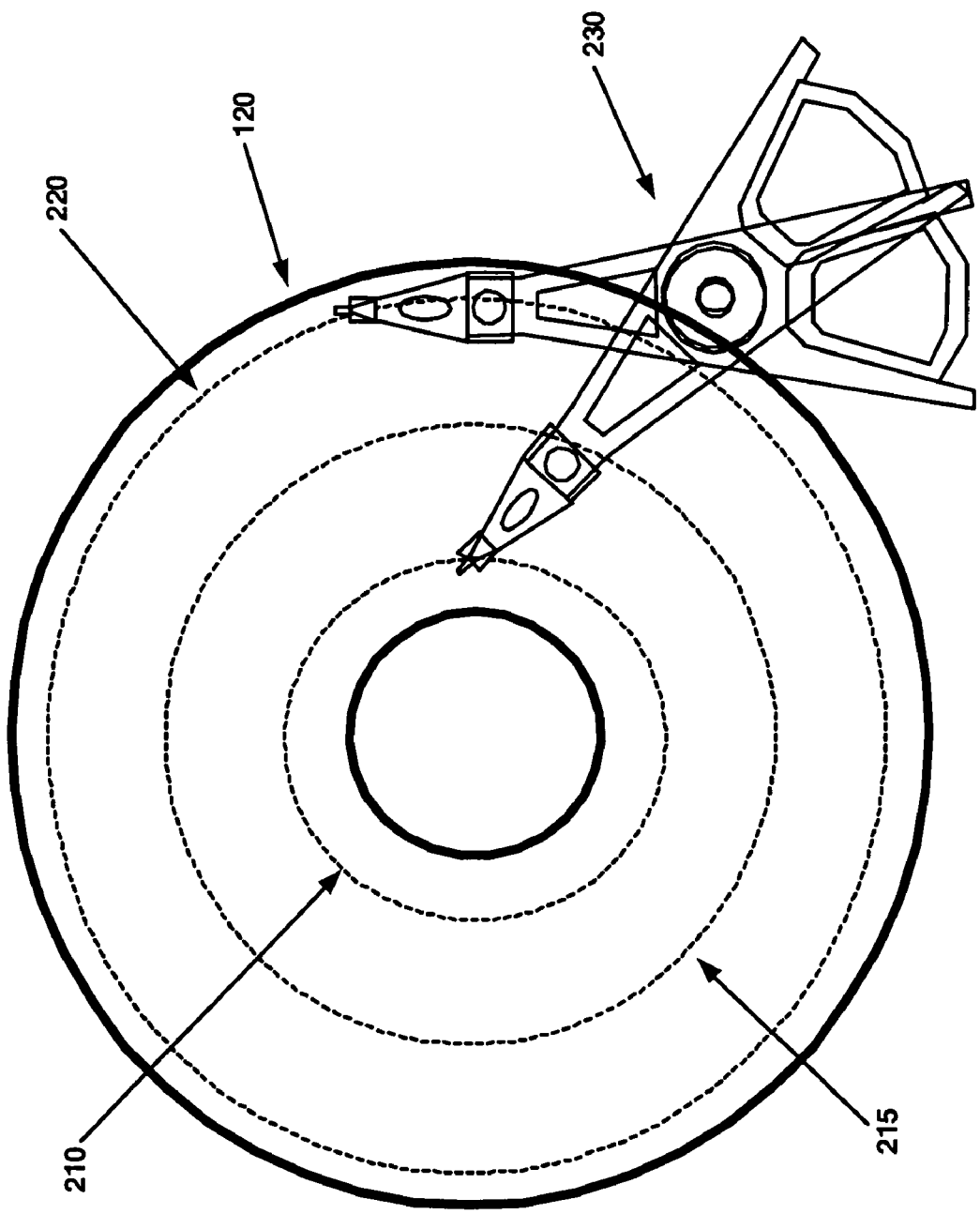
FIG. 2 is a top view of an exemplary storage disk.

Reference will now be made in detail to the alternative embodiment(s)s of the present invention, an apparatus and method for improving the error rate of track information on a magnetic storage device. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor The discussion will begin with an overview of an exemplary magnetic storage device. That is, a hard disk drive and the components connected therewith. The discussion will then focus on embodiments of a method for improving the error rate of track information on a magnetic storage device in particular.

Overview

In one embodiment, to mitigate adjacent track interference (ATI) induced error rate degradation, after several writings to a data track the information stored in the adjacent tracks of the storage device (e.g., a hard disk, floppy disk, removable disk, or the like) is read and then re-written to the storage device. In so doing, the ATI induced error rate degradation of the adjacent tracks is significantly reduced. That is, the effects of the ATI cannot build up because significant repetitive writing of a single track on a storage device is avoided. Therefore, since the adjacent tracks are re-written before the ATI effects can build up, the reliability of the data on the adjacent tracks is improved while the error rate of the magnetic storage device is decreased.

Figure 3:
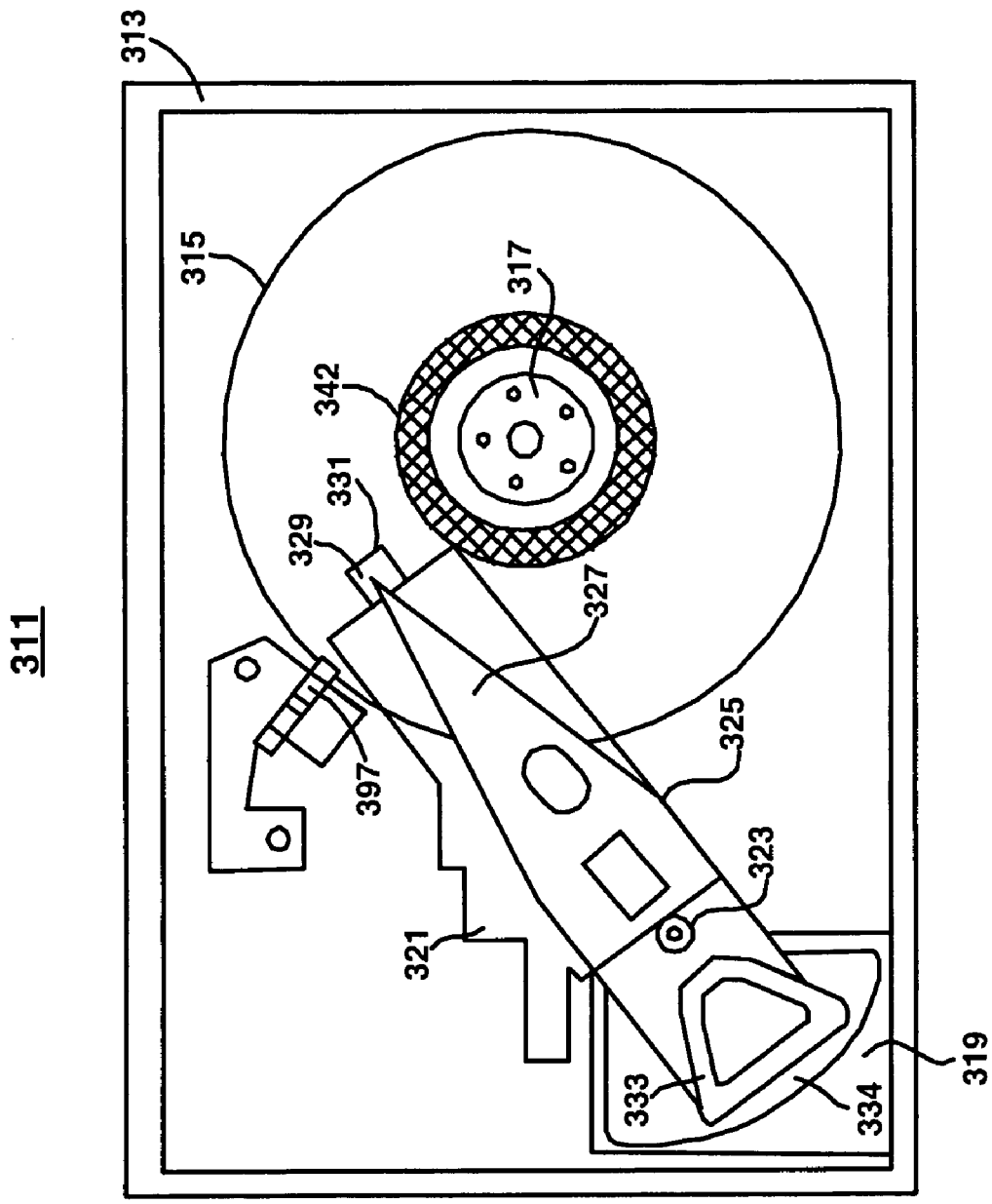
FIG. 3 is a schematic top plan view of a hard disk drive, in accordance with one embodiment of the present invention.

With reference now to FIG. 3, a schematic drawing of one embodiment of an information storage system comprising a magnetic hard disk file or drive 311 for a computer system is shown. Embodiments of the invention are well suited for utilization on different types of magnetic storage media (e.g., removable, fixed, and the like), or on a plurality of magnetic storage media within a single device. The utilization of the hard disk drive (HDD) of FIG. 3 is merely one of a plurality of magnetic storage media that may be utilized in conjunction with the present invention and is shown for brevity and clarity.

In one embodiment the hard disk drive 311 uses load/unload (L/UL) techniques with a ramp 397. In another embodiment, the drive 311 is a non L/UL drive, for example, a contact start-stop (CSS) drive having a textured landing zone 342 away from the data region of disk 315.

In the exemplary FIG. 3, drive 311 has an outer housing or base 313 containing a disk pack having at least one media or magnetic disk 315. A spindle motor assembly having a central drive hub 317 rotates the disk or disks 315. An actuator 321 comprises a plurality of parallel actuator arms 325 (one shown) in the form of a comb that is movably or pivotally mounted to base 313 about a pivot assembly 323. A controller 319 is also mounted to base 313 for selectively moving the comb of arms 325 relative to disk 315.

In the embodiment shown, each arm 325 has extending from it at least one cantilevered ELS 327. It should be understood that ELS 327 is, in one embodiment, an integrated lead suspension (ILS) that is formed by a subtractive process. In another embodiment, ELS 327 may be formed by an additive process, such as a Circuit Integrated Suspension (CIS). In yet another embodiment, ELS 327 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 331 or head is mounted on a slider 329 and secured to a flexure that is flexibly mounted to each ELS 327. The read/write heads magnetically read data from and/or magnetically write data to disk 315. The level of integration called the head gimbal assembly is the head and the slider 329, which are mounted on suspension 327. The slider 329 is usually bonded to the end of ELS 327.

ELS 327 has a spring-like quality, which biases or presses the air-bearing surface of the slider 329 against the disk 315 to cause the slider 329 to fly at a precise distance from the disk. ELS 327 has a hinge area that provides for the spring-like quality, and a flexing interconnect (or flexing interconnect) that supports read and write traces through the hinge area. A voice coil 333, free to move within a conventional voice coil motor magnet assembly 334 (top pole not shown), is also mounted to arms 325 opposite the head gimbal assemblies. Movement of the actuator 321 (indicated by arrow 335) by controller 319 causes the head gimbal assemblies to move along radial arcs across tracks on the disk 315 until the heads settle on their set target tracks. The head gimbal assemblies operate in a conventional manner and always move in unison with one another, unless drive 311 uses multiple independent actuators (not shown) wherein the arms can move independently of one another.

In general, the load/unload drive refers to the operation of the ELS 327 with respect to the operation of the disk drive. That is, when the disk 315 is not rotating, the ELS 327 is unloaded from the disk. For example, when the disk drive is not in operation, the ELS 327 is not located above the disk 315 but is instead located in a holding location away from the disk 315 (e.g., unloaded). Then, when the disk drive is operational, the disk(s) are spun up to speed, and the ELS 327 is moved into an operational location above the disk(s) 315 (e.g., loaded).

Operation

Figure 4:
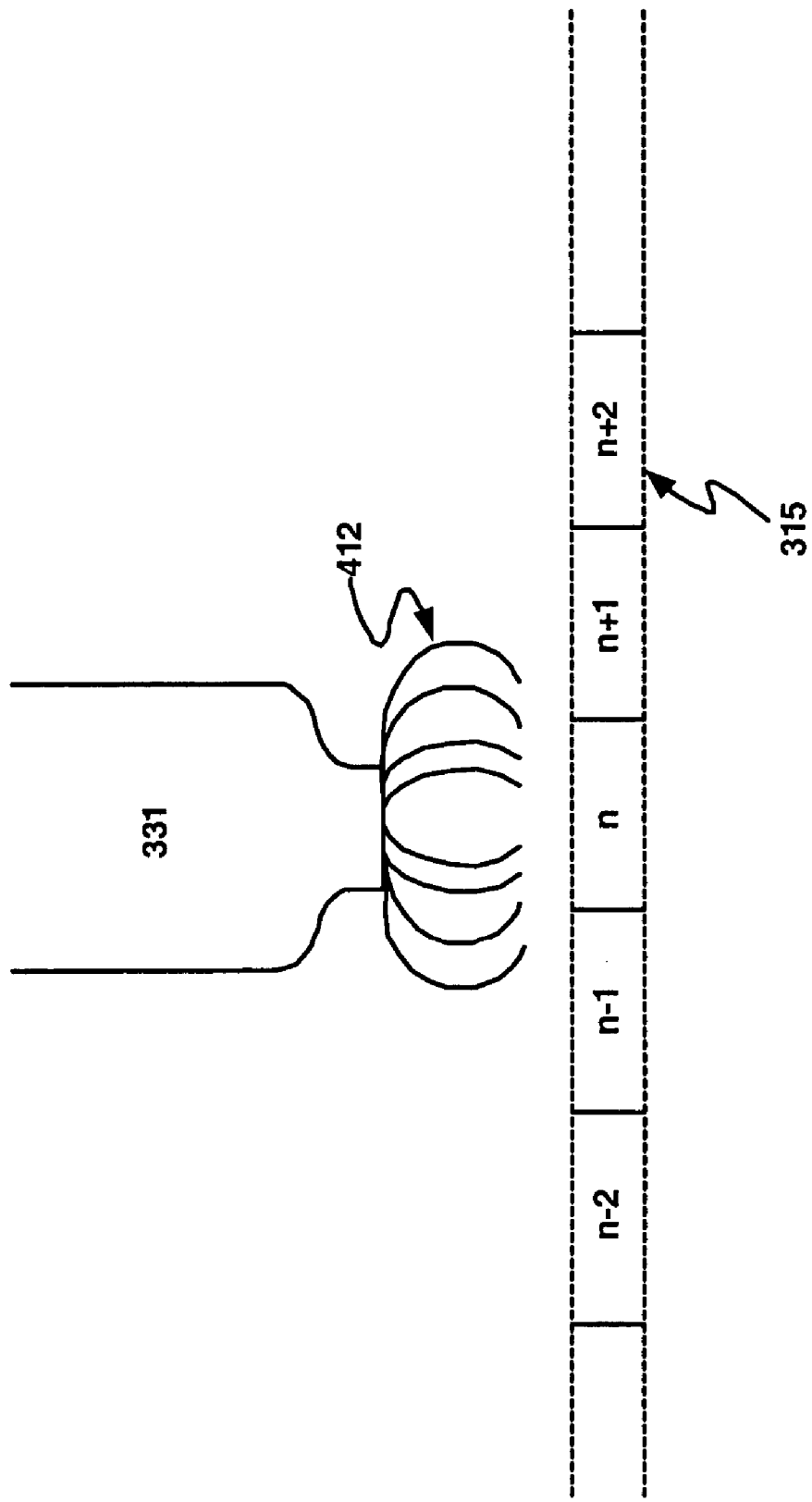
FIG. 4 is an exemplary side view of a read-write head for a storage device and storage track layout in accordance with one embodiment of the present invention.

Referring now to FIG. 4, an exemplary side view of a read-write head for a storage device and storage track layout on a magnetic media is shown in accordance with one embodiment of the present invention. In general, diagram 400 includes a cross section of a write head 331 and a storage disk 315 having tracks n−2 through n+2 thereon. Although, only 5 tracks are shown, it is appreciated that the storage disk may contain thousands of tracks. The utilization of 5 tracks in diagram 400 is merely for purposes of brevity and clarity. As is shown in diagram 400, the spacing of the tracks (n−2 through n+2) provide much more of the adjacent tracks within the fringe field 412 effect from the write head 331. In one embodiment, more of the adjacent tracks are within the fringe field 412 due to decreased track spacing. In another embodiment, more of the adjacent tracks are within the fringe field 412 due to increased head 331 size.

Figure 5:
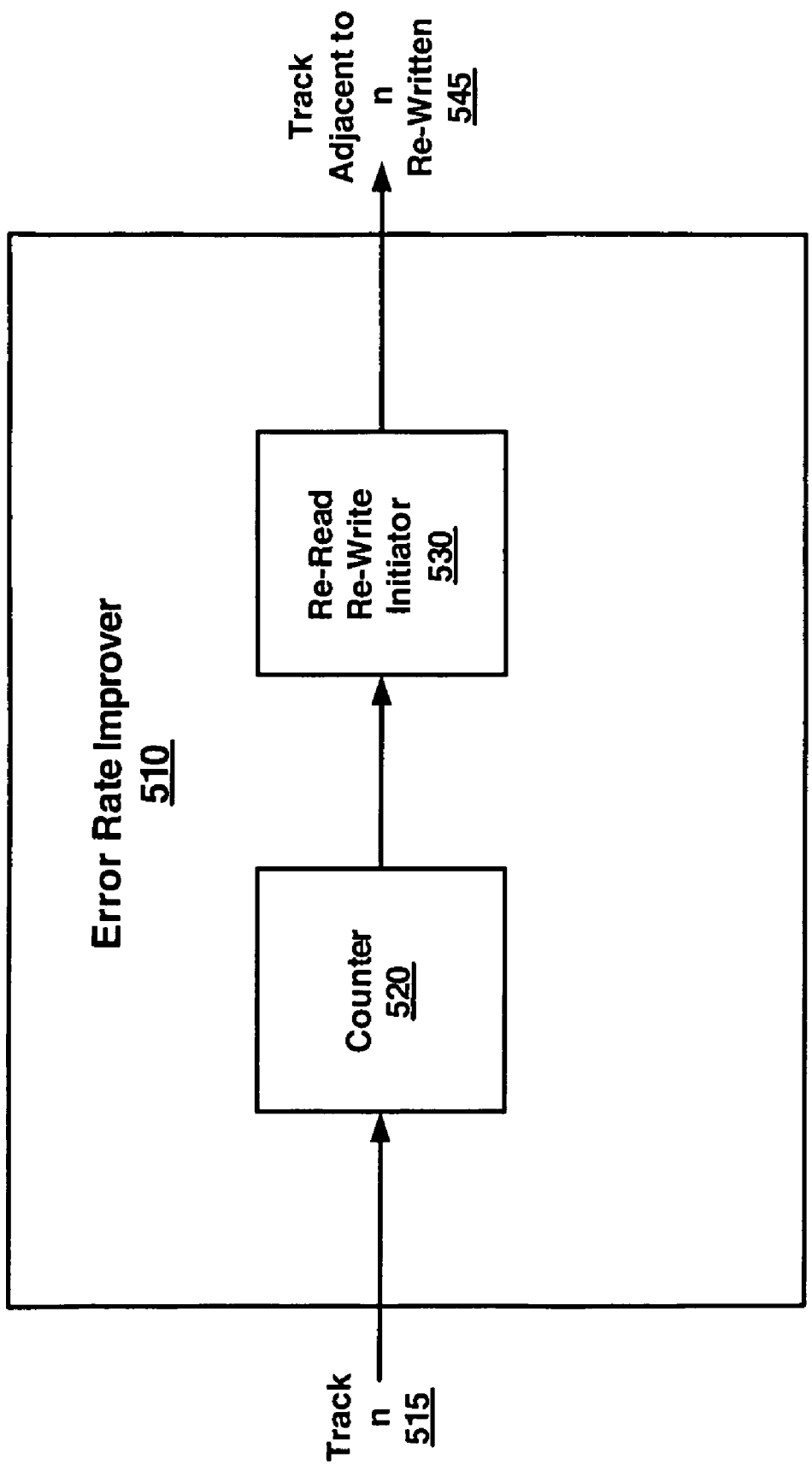
FIG. 5 is a block diagram of an exemplary error rate improver in accordance with one embodiment of the present invention.

With reference now to FIG. 5, an error rate improver is shown in accordance with one embodiment of the present invention. In one embodiment, error rate improver 500 includes write counter 520 and a re-read re-write initiator 530. In general, the write counter 520 is used for counting the number of times that a track n 515 is written. Re-read/Re-write initiator 530 is used to read the track (or tracks) adjacent to track n and then re-write the information 545 to the same location of the track (or tracks) adjacent to track n.

Figure 6:
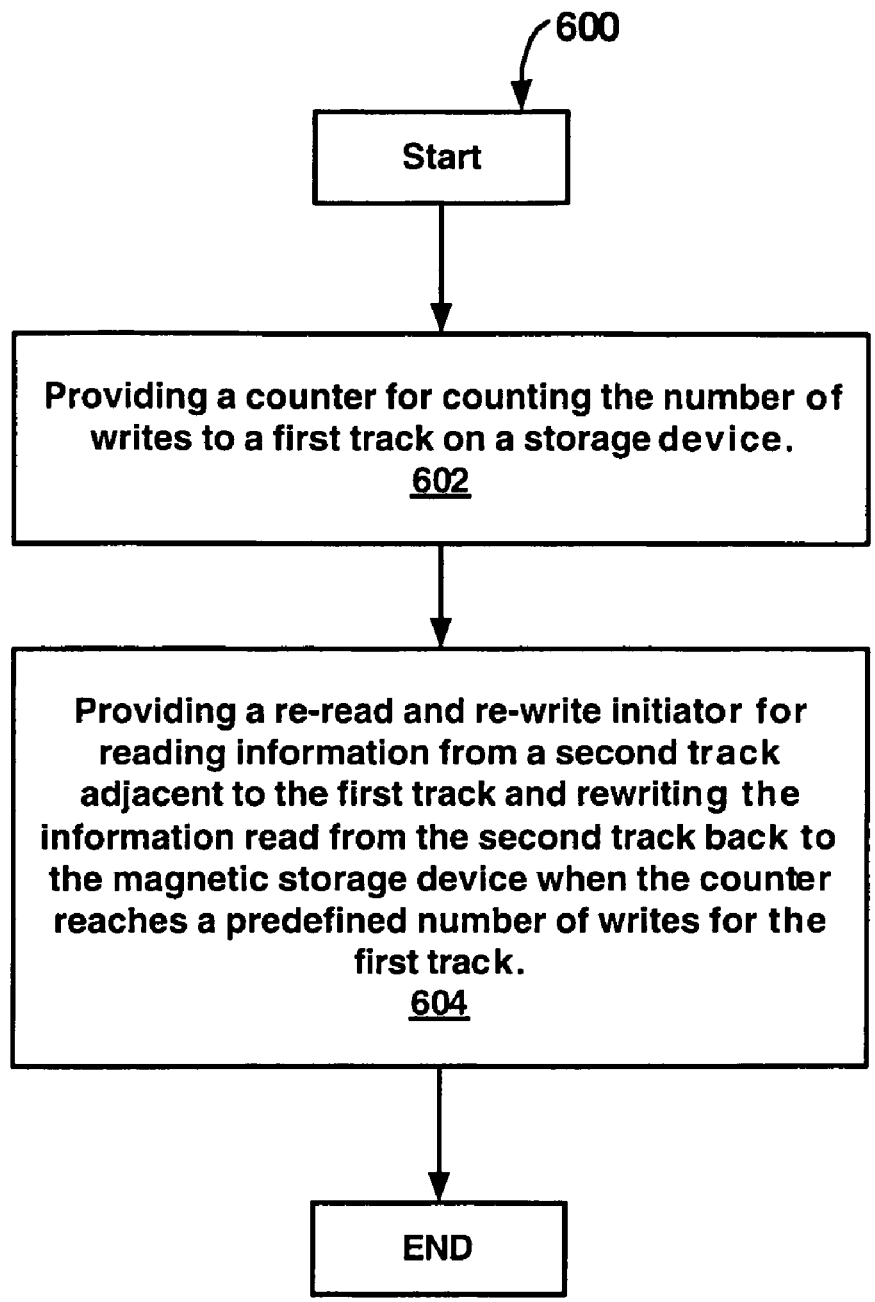
FIG. 6 is a flowchart of a method for improving the error rate of track information on a storage device in accordance with one embodiment of the present invention.

Referring now to FIG. 6, a flowchart 600 of a method for improving the error rate of track information on a storage device is shown in accordance with one embodiment of the present invention. Typically, one order of degradation is allowed in the adjacent tracks (e.g. on each side, two on each side, or n on each side) of the data track being written after 10,000 (10 k) writes to the data track n. The decay of bit error rate (BER) for the data written in adjacent tracks (e.g., n−2 through n+2) typically shows logarithmic dependence on the number of writing cycles performed on data track n. Due to the logarithmic nature of the BER, it is understood that the most severe decay occurs during the first 100 cycles of writing.

Therefore, by counting the number of times the data track n has been written and re-writing the adjacent tracks well before the 10 k writes to data track n, the BER is greatly decreased. In one embodiment, the re-writing of the adjacent tracks is performed at approximately 100 writes to data track n, to further decrease the BER. In another embodiment, the re-writing of the adjacent tracks is performed at less than 100 writes to data track n. In another embodiment, the re-writing of the adjacent tracks is performed at approximately 10 writes to data track n.

With reference now to step 602 of FIG. 6 and to FIG. 5, one embodiment provides a counter 520 for counting the number of writes to a first track on a magnetic storage device. As described herein, in one embodiment, the counter 520 is a memory location for storing the number of times that a specific track n is written. Counter 520 may be an additional portion of memory, or may utilize the existing memory utilized by the HDD during standard operation. Moreover, in one embodiment, counter 520 will be stored on a flash memory or other type of non-magnetic memory. In yet another embodiment, the counter 520 memory allocation is outside of the normal memory location utilized by the HDD of FIG. 3.

In another embodiment, the counter 520 counts the number of writes to every track on the magnetic storage device. That is, instead of counting only the writes to a specific track n, the counter 520 will count the writes on a per track basis for every track on the disk. In another embodiment, counter 520 will only count the writes of the tracks at the weakest point of the disk. For example, if the outer track (or inner track, or inner and outer track) on the disk is a weak location, e.g., has the most significant BER degradation due to ATI, then the counter 520 will only count the writes to the outer track (or inner track, both inner and outer track, or the like). That is, the utilization of the counter 520 is scalable such that a single track, a plurality of tracks, or all the tracks on the magnetic storage medium are capable of being write-counted.

With reference now to step 604 of FIG. 6 and to FIG. 4, one embodiment provides a re-read and re-write initiator 530 for reading information from a second track (e.g., n−1, n+1, n−2, n+2, or the like) adjacent to the first track (e.g., track n) and re-writing the information read from the second track. In one embodiment, the re-read re-write initiator 530 will begin after the counter reaches a pre-defined number of writes to the first track n and provides a start signal to the re-read re-write initiator 530. In one embodiment, the data from the second track is re-written to the same location on the second track. In another embodiment, the data read from the second track is written to a new location on the disk. In one embodiment, the location for writing the data from the second track is defined by a least used disk space algorithm.

In one embodiment, the pre-defined number of writes to a track is dependent on the HDD design. For example, if the counter 520 (of FIG. 5) is defined as re-writing the adjacent tracks (e.g., n−2 through n+2 of FIG. 4) after 10 cycles, the re-writing algorithm will provide gains of 0.75 order of BER. This 0.75 order of BER also translates into the capability to significantly reduce track width by up to 30 nm. That is, since the adjacent tracks are re-written well before the effects of BER become noticeable, the track pitch (or spacing) on the disk 315 can be reduced. In other words, even though the fringe field 412 of FIG. 4 now significantly crosses into the n−1 and n+1 tracks on the magnetic storage 315, the data on the tracks n−1 and n+1 will be re-written before the effects of BER are noticeable. Thereby allowing the BER to be reduced to 1000 (1 k) instead of the previous 10 k without impacting the quality control standards. In another embodiment, the reduction in BER, due to re-write of the adjacent track information, provides the ability to increase the head 331 size while maintaining or even reducing track pitch.

Figure 7:
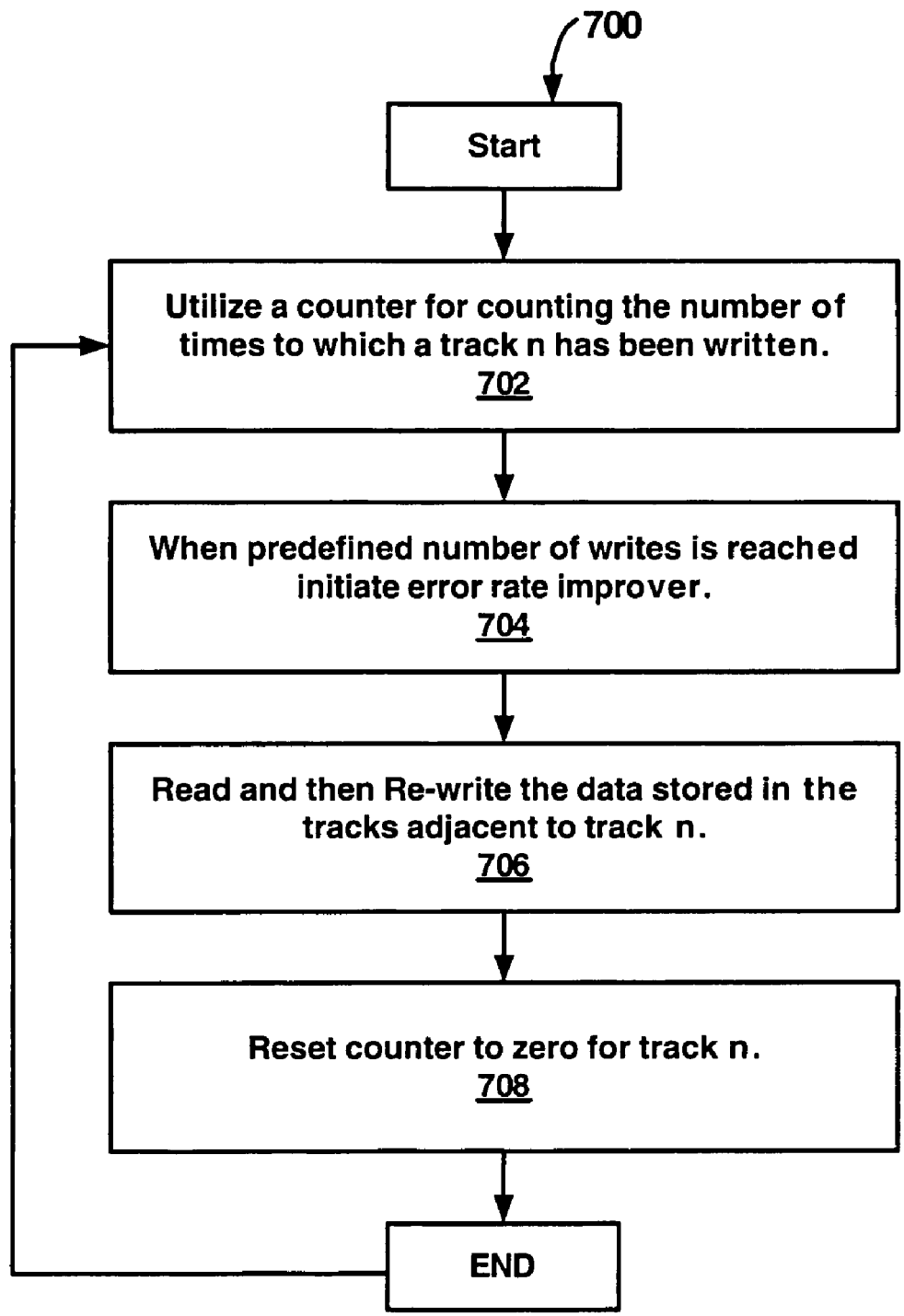
FIG. 7 is a flowchart of one exemplary method for utilizing the error rate improver to improve the error rate of track information on a storage device in accordance with one embodiment of the present invention.

Referring now to FIG. 7, a flow diagram 700 for improving the error rate of track information on a storage device is shown in accordance with an embodiment of the present invention. Flow diagram 700 is merely one of a plurality of methods for utilizing the error rate improver 510 of FIG. 5 to reduce ATI.

With reference now to step 702 of FIG. 7 and to FIG. 5, one embodiment utilizes a counter 520 for counting the number of times to which a track (e.g., track n of FIG. 4) has been written. In another embodiment, the counter 520 is counting the number of times to which a plurality of tracks is written. In yet another embodiment, the counter 520 is counting the number of times that every track on the magnetic storage device is written.

Referring now to step 704 of FIG. 7 and to FIG. 5, when a predetermined number of writes is reached, the error rate improver 510 is initiated. As described herein, the predetermined number is low enough to reduce the BER. In one embodiment, the predetermined number is approximately 10. In another embodiment, the predetermined number is approximately 100. In yet another embodiment, the predetermined number is less than 10 k.

With reference now to step 706 of FIG. 7 and to FIG. 5, one embodiment reads and then re-writes the data stored in the tracks (e.g., n−2 through n+2) adjacent to track n (of FIG. 4).

Although two adjacent tracks are specified as being read and re-written, the number of adjacent tracks read and re-written (e.g., 1, 2, 3, etc.) are variable and may be based on track width, head size, problem area of the disk, skew of the head, age of the disk, and the like. Moreover, as stated herein, in one embodiment, the data is re-written to the same location. In another embodiment, the data is written to a new location on the magnetic storage device.

Referring now to step 708 of FIG. 7 and to FIG. 5, on embodiment resets the counter 520 to zero for the track n (of FIG. 4) after the data on the tracks adjacent to track n (e.g., tracks n–2 through n+2, or the like) has been re-written. That is, restarting the counter for the specific track n since a read/re-write step has occurred.

Thus, embodiments of the present invention provide, a method and system for improving the error rate of track information on a magnetic storage device. Additionally, embodiments provide a method and system for improving the error rate of track information on a magnetic storage device which allows for reduction in track width without sacrificing the bit error rate. Moreover, embodiments provide a method for improving the error rate of track information on a magnetic storage device which is compatible with present magnetic storage devices.

While the method of the embodiment illustrated in flow-charts 600 and 700 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for improving the error rate of track information on a magnetic storage device is thus described. While the present invention has been described in particular embodiments, it should be appreciated that the present invention should not be construed as limited by such embodiments, but rather construed according to the below claims.

What is claimed is:

1. A method for improving the error rate of track information on a magnetic storage device comprising:
    providing a counter for counting the number of writes to a first track on a magnetic storage device; and
    providing a re-read and re-write initiator for reading information from at least two tracks on either side of said first track and re-writing the information read from said at least two tracks on either side of said first track back to said magnetic storage device when said counter reaches a pre-defined number of writes for said first track.

2. The method of claim 1 wherein said counter further comprises:
    counting the number of writes for a plurality of tracks on said magnetic storage device.

3. The method of claim 1 wherein said magnetic storage device is a disk in a hard disk drive.

4. The method of claim 1 wherein the information read from said at least two tracks is written back to said at least two tracks on either side of said first track.

5. The method of claim 1 wherein the information read from said second track is written back to a location other than said at least two tracks on either side of said first track on said magnetic storage device.

6. The method of claim 1 wherein said re-read and re-write initiator further comprises:
    reading and re-writing information for a plurality of tracks adjacent to said first track after said counter reaches a pre-defined number of writes for said first track.

7. The method of claim 1 wherein said pre-defined number of writes to said first track is approximately 100.

8. A hard disk drive comprising:
    a housing;
    a disk pack mounted to the housing and having a plurality of disks that are rotatable relative to the housing, the disk pack defining an axis of rotation and a radial direction relative to the axis;
    an actuator mounted to the housing and being movable relative to the disk pack, the actuator having a suspension for reaching over the disk, the suspension having a slider coupled therewith, said slider having a read/write head element on a trailing edge (TE) portion of said slider; and
    a memory controller having an error-rate improver comprising:
        a write counter for counting the number of writes to a first track on at least one of said disks; and
        a re-read and re-write initiator for reading information from at least two tracks on either side of said first track and re-writing the information read from said at least two tracks on either side of said first track back to at least one of said disks when said counter reaches a pre-defined number of writes for said first track.

9. The hard disk drive of claim 8 wherein said write counter counts the number of writes for a plurality of tracks on at least one of said disks.

10. The hard disk drive of claim 8 wherein said write counter counts the number of writes for a plurality of tracks on a plurality of said disks.

11. The hard disk drive of claim 8 wherein the information read from said at least two tracks is written back to said at least two tracks on either side of said first track.

12. The hard disk drive of claim 8 wherein the information read from said at least two tracks is written back to a location other than said at least two tracks on either side of said first track on said at least one of said disks.

13. The hard disk drive of claim 8 wherein said pre-defined number of writes to said first track is approximately 100.

14. A computer-usable data storage device storing instructions capable of being executed by a computer for causing a method for improving the error rate of track information on a magnetic storage device comprising: providing a counter for counting the number of writes to a first track at the weakest point on a magnetic storage device; and providing a re-read and re-write initiator for reading information from at least two tracks on either side of said first track and re-writing the information read from said at least two tracks on either side of said first track back to said magnetic storage device when said counter reaches a pre-defined number of writes for said first track.

15. The computer-usable medium of claim 14 wherein said counter further comprises:
    counting the number of writes for a plurality of tracks on said magnetic storage device.

16. The computer-usable medium of claim 14 wherein said magnetic storage device is a disk in a hard disk drive.

17. The computer-usable medium of claim 14 wherein the information read from said at least two tracks on either side of said first track is written back to said at least two tracks on either side of said first track.

18. The computer-usable medium of claim 14 wherein the information read from said at least two tracks on either side of said first track is written back to a location other than said at least two tracks on either side of said first track on said magnetic storage device.

19. The computer-usable medium of claim 14 wherein said re-read and re-write initiator further comprises:

reading and re-writing information for a plurality of tracks adjacent to said first track after said counter reaches a pre-defined number of writes for said first track.

20. The computer-usable medium of claim 14 wherein said pre-defined number of writes to said first track is approximately 100.

21. An error-rate improver for a magnetic storage device comprising:

a means for counting the number of writes to a first track on a magnetic storage device; and a means for reading information from at least two tracks on either side of said first track adjacent to said first track and re-writing the information read from said at least two tracks on either side of said first track back to said magnetic storage device when means for counting the number of writes to a first track reaches a pre-defined number of writes for said first track.

* * * * *